(12) United States Patent
Alderson et al.

(10) Patent No.: US 7,792,220 B2
(45) Date of Patent: Sep. 7, 2010

(54) DEMODULATOR SYSTEM AND METHOD

(75) Inventors: Jeffrey Donald Alderson, Austin, TX (US); Darrell Tinker, Austin, TX (US); K. Gozie Ifesinachukwu, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 931 days.

(21) Appl. No.: 11/641,995

(22) Filed: Dec. 19, 2006

(65) Prior Publication Data

US 2008/0144743 A1 Jun. 19, 2008

(51) Int. Cl.
*H04L 27/00* (2006.01)
*H04L 27/06* (2006.01)
*H04L 27/22* (2006.01)

(52) U.S. Cl. .................. 375/324; 375/320; 329/304; 700/94

(58) Field of Classification Search ................ 375/283, 375/324, 329, 330, 268, 269, 320; 329/304, 329/347, 348, 313, 316, 341; 455/205, 207, 455/209, 130, 334, 337; 700/94

See application file for complete search history.

(56) References Cited

U.S. PATENT DOCUMENTS

| | | | |
|---|---|---|---|
| 4,625,126 A | 11/1986 | Tinker et al. |
| 5,185,609 A | 2/1993 | DeBord |
| 5,230,011 A * | 7/1993 | Gielis et al. ................. 375/344 |
| 5,559,513 A | 9/1996 | Rothermel et al. |
| 5,617,344 A | 4/1997 | Young et al. |
| 5,634,116 A | 5/1997 | Singer |
| 5,796,995 A | 8/1998 | Nasserbakht et al. |
| 5,915,028 A | 6/1999 | Chahabadi |
| 5,949,363 A | 9/1999 | Kosiak et al. |
| 6,055,619 A | 4/2000 | North et al. |
| 6,057,793 A | 5/2000 | Gong et al. |
| 6,175,269 B1 | 1/2001 | Gielis et al. |
| 6,184,942 B1 | 2/2001 | Patel et al. |
| 6,208,671 B1 | 3/2001 | Paulos et al. |
| 6,211,924 B1 | 4/2001 | Patel et al. |
| 6,310,653 B1 | 10/2001 | Malcolm, Jr. et al. |
| 6,333,767 B1 | 12/2001 | Patel et al. |
| 6,362,755 B1 | 3/2002 | Tinker |
| 6,373,912 B1 | 4/2002 | Yu |
| 6,480,233 B1 | 11/2002 | Limberg |
| 6,501,410 B1 * | 12/2002 | Kameda et al. ............. 375/324 |
| 6,512,555 B1 | 1/2003 | Patel et al. |
| 6,523,147 B1 | 2/2003 | Kroeger et al. |
| 6,526,101 B1 | 2/2003 | Patel |
| 6,584,145 B1 | 6/2003 | Camagna et al. |
| 6,584,162 B1 | 6/2003 | Tinker |
| 6,694,026 B1 | 2/2004 | Green |
| RE38,456 E | 3/2004 | Patel et al. |
| 6,700,936 B1 | 3/2004 | Moss |
| 6,701,140 B1 | 3/2004 | Stine |

(Continued)

*Primary Examiner*—Betsy L Deppe
(74) *Attorney, Agent, or Firm*—Toler Law Group

(57) ABSTRACT

A demodulator system and method is disclosed. In an embodiment, the demodulator system can include a Coordinate Rotation Digital Computer (CORDIC) mixer to mix a first signal substantially to baseband using a first input frequency and to mix a second signal substantially to baseband using a second input frequency. In another embodiment, the demodulator system can include a phase detector to receive a pilot signal and to generate a control signal to adjust a decimation rate based on the pilot signal. In another embodiment, the demodulator system can include a symbol decoder to determine a symbol from a phase signal.

29 Claims, 6 Drawing Sheets

U.S. PATENT DOCUMENTS

| | | |
|---|---|---|
| 6,738,610 B1 | 5/2004 | Wildhagen |
| 6,778,106 B2 | 8/2004 | Lenez et al. |
| 6,801,028 B2 | 10/2004 | Kernahan et al. |
| 7,071,773 B2 | 7/2006 | Kuhn et al. |
| 7,079,657 B2 | 7/2006 | Wu et al. |
| 7,106,224 B2 | 9/2006 | Knapp et al. |
| 7,180,349 B2 | 2/2007 | Leifso et al. |
| 2001/0040930 A1 | 11/2001 | Abbey |
| 2004/0032922 A1 | 2/2004 | Knapp et al. |
| 2004/0075766 A1 | 4/2004 | Schoner |
| 2004/0264614 A1 | 12/2004 | Tinker |
| 2006/0017498 A1 | 1/2006 | Kuhn et al. |
| 2006/0077300 A1 | 4/2006 | Cheon et al. |
| 2006/0179095 A1 | 8/2006 | Lo Muzio et al. |

\* cited by examiner

DEMODULATOR SYSTEM AND METHOD

FIELD OF THE DISCLOSURE

The present disclosure is generally related to demodulator systems and methods.

BACKGROUND

Demodulator systems can be used for applications such as television, radio, and satellite communications. Audio data can be encoded in a modulated signal using a variety of modulation techniques. Some methods of audio data encoding require the use of a phase lock loop to extract the audio data from encoded signals. Establishing a phase lock can enable audio data to be extracted from some data signals by determining a phase difference between sequential samples of the data signal. However, phase lock loop circuits can be costly or unreliable, and noisy signals can interfere with recovery of phase differences encoded in an audio signal Therefore, there is a need for an improved demodulator system and method.

DETAILED DESCRIPTION OF THE DRAWINGS

Figure 1:
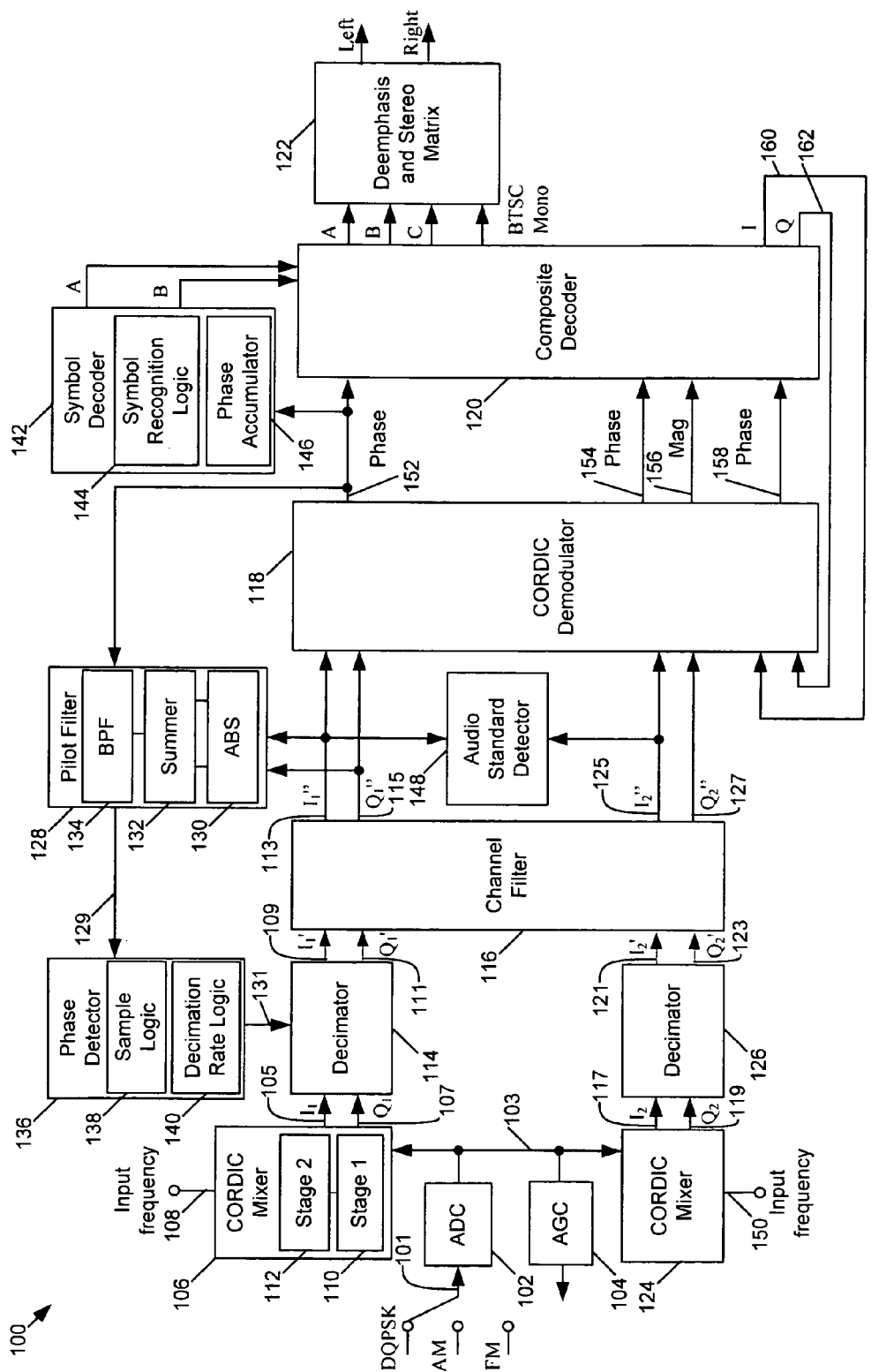
FIG. 1 is a block diagram of a particular illustrative embodiment of a demodulator system.

In an embodiment, a demodulator system is disclosed that includes an analog-to-digital converter (ADC) configured to sample a modulated signal and to output a digital signal. The demodulator system includes a Coordinate Rotation Digital Computer (CORDIC) mixer coupled to an output of the ADC, the CORDIC mixer to generate an Inphase (I) signal and a Quadrature (Q) signal based on the digital signal output by the ADC and further based on an input frequency. The demodulator system also includes a filter path to process the I signal and the Q signal generated at the CORDIC mixer and a demodulation stage to demodulate an output of the filter path, where the demodulation stage includes a CORDIC demodulator.

In another embodiment, a demodulator system is disclosed that includes a Coordinate Rotation Digital Computer (CORDIC) mixer to receive a first input signal modulated using a first modulation mode. The CORDIC mixer is configured to generate a first Inphase (I) signal and a first Quadrature (Q) signal by mixing the first input signal substantially to baseband using a first input frequency. The CORDIC mixer is further configured to receive a second input signal modulated using a second modulation mode. The CORDIC mixer is also configured to generate a second I signal and a second Q signal by mixing the second input signal substantially to baseband using a second input frequency. The second demodulator system also includes a filter path to process an output of the CORDIC mixer and a demodulation stage to demodulate an output of the filter path, where the demodulation stage includes a CORDIC demodulator.

In another embodiment, a demodulator system is disclosed that includes a Coordinate Rotation Digital Computer (CORDIC) mixer to generate an Inphase (I) signal and a Quadrature (Q) signal based on a modulated input signal and an input frequency. The demodulator system includes a decimator to perform decimation of the I signal and the Q signal at an adjustable decimation rate and a phase detector to receive a pilot signal. The phase detector includes decimation rate logic to generate a control signal to adjust the decimation rate based on the pilot signal. An oversample rate of the pilot signal is not less than approximately two and not more than approximately sixty-four. The demodulator system also includes a demodulation stage to demodulate a filtered output of the decimator, where the demodulation stage includes a CORDIC demodulator.

In another embodiment, a demodulator system is disclosed that includes a Coordinate Rotation Digital Computer (CORDIC) mixer to generate an Inphase (I) signal and a Quadrature (Q) signal. The demodulator system also includes a decimator coupled to the CORDIC mixer to adjust a sample rate of at least one of the I signal and the Q signal. The demodulator system includes a filter path coupled to the decimator to process an output of the decimator. The demodulator system further includes a demodulation stage to demodulate an output of the filter path, where the demodulation stage includes a CORDIC demodulator. The demodulator system also includes a symbol decoder to receive a phase signal from the CORDIC demodulator. The symbol decoder includes symbol recognition logic to adjust a sample of the phase signal by an offset value and to map the adjusted sample to a nearest predetermined phase value of a plurality of predetermined phase values. The symbol recognition logic is also configured to determine a symbol using a difference between the nearest predetermined phase value and a prior nearest predetermined phase value. The offset value at least partially compensates for a phase drift generated at the CORDIC mixer.

In another embodiment, a demodulation method is disclosed. The method includes receiving a modulated signal and mixing the audio signal substantially to baseband at a Coordinate Rotation Digital Computer (CORDIC) mixer having multiple pipelined mixing stages. The method also includes decimating an output of the CORDIC mixer at a decimator having an adjustable decimation rate. The method further includes demodulating a filtered output of the decimator with a CORDIC demodulator.

Referring to FIG. 1, a particular illustrative embodiment of a digital demodulator system is depicted and generally designated 100. The system 100 includes an analog-to-digital converter (ADC) 102 to sample a modulated input signal 101 received at the demodulator system 100 and to generate a corresponding digital signal output 103. The output 103 of the ADC 102 is coupled to an automatic gain controller (AGC) 104, a first CORDIC mixer 106 and a second CORDIC mixer 124. A first channel path includes a first decimator 114 coupled to receive outputs 105 and 107 of the first CORDIC mixer 106 and providing outputs 109 and 111 to a channel filter 116. A second channel path includes a second decimator 126 coupled to receive outputs 117 and 119 of the second CORDIC mixer 124 and providing outputs 121 and 123 to the channel filter 116.

The channel filter 116 is coupled to a CORDIC demodulator 118. Outputs 152, 154, 156 and 158 of the CORDIC demodulator 118 are received at a composite decoder 120. A deemphasis and stereo matrix 122 receives an output of the composite decoder 120 and provides left and right audio signals. An audio standard detector (ASD) 148 is coupled to the first channel output 113 of the channel filter 116 and to the second channel output 125 of the channel filter 116.

The first channel path includes a pilot filter 128 coupled to the output 113 and the output 115 of the channel filter 116. The first channel path is further coupled to a phase output 152 of the CORDIC demodulator 118. A phase detector 136 is coupled to an output 129 of the pilot filter 128 and provides an output 131 to the first decimator 114. A symbol decoder 142 is coupled to phase output 152 of the CORDIC demodulator 118 and provides an output to the composite decoder 120.

In a specific embodiment, the ADC 102 can be an eight-bit pipeline ADC followed by a 3-bit flash ADC. The ADC 102 can sample the input signal 101 at 24.576 MHz and can have a signal-to-noise ratio (SNR) better than 54 dB. The ADC 102 can include a synchronization circuit to prevent metastable conditions.

In a specific embodiment, the AGC 104 can provide a gain signal to a variable gain amplifier (not shown) that provides the input signal 101 to the ADC 102. The gain signal can enable the variable gain amplifier to adjust an output to maintain the input signal 101 at about 80% of full scale. Operation of the AGC 104 can be modified when the ASD 148 determines that the input signal 101 includes an amplitude modulated (AM) signal.

In a particular embodiment, the demodulator system 100 supports at least twelve audio standards including A2, Near Instantaneous Companded Audio Multiplex (NICAM), Broadcast Television Systems Committee (BTSC), and Electronic Industries Association of Japan (EIAJ). In an embodiment, the ASD 148 can determine a new audio standard of the input signal 101 when the input signal 101 changes. In a specific embodiment, when the ASD 148 receives notice that the input signal 101 has changed, the ASD 148 can set the decimation rate of the first decimator 114 and the second decimator 126 to a predetermined rate and can set the channel filter 116 to pass a predetermined bandwidth. The ASD 148 can provide various frequencies 108 to the first CORDIC mixer 106 and various frequencies 150 to the second CORDIC mixer 124 to mix the input signal 101 to baseband. The ASD 148 can detect an energy level associated with each frequency to determine the most likely standard received. When the ASD 148 has determined the standard of the new input signal 101, the ASD 148 can select the input frequency 108 provided to the first CORDIC mixer 106 and the second frequency 150 provided to the second CORDIC mixer 124 according to the determined standard. The ASD can also determine initial decimation rates of the first decimator 114 and the second decimator 126, as well as coefficient values for filters within the channel filter 116.

In an embodiment, the first CORDIC mixer 106 can generate a first Inphase signal ($I_1$) 105 and a first Quadrature signal ($Q_1$) 107 for the first channel by mixing the signal 103 received from the ADC 102 substantially to baseband using an input frequency 108. In a particular embodiment, the first CORDIC mixer 106 can have multiple pipelined mixing stages, including a first mixing stage 110 and a second mixing stage 112. In a particular embodiment, the first CORDIC mixer 106 can perform a predetermined number of CORDIC iterations for each sample of the signal 103. In another particular embodiment, the first CORDIC mixer 106 can achieve a predetermined mixing accuracy without using an oscillator or a multiplication function.

In an embodiment, the first decimator 114 can perform decimation on each of the $I_1$ signal 105 and the $Q_1$ signal 107 output by the first CORDIC mixer 106 at an adjustable decimation rate to produce a second Inphase signal ($I_1'$) 109 and a second Quadrature signal ($Q_1'$) 111 for the first channel. The decimation rate is expressed as a sample rate at a decimator input divided by the output sample rate. In a particular embodiment, the first decimator 114 can include a first independent decimation circuit (not shown) to decimate the $I_1$ signal 105 and a second independent decimation circuit (not shown) to decimate the $Q_1$ signal 107. In a particular embodiment, the first decimator 114 can be a variable rate, fractional decimator. The first decimator 114 can be responsive to a control signal 131 from the phase detector 136 to adjust the decimation rate. In a specific embodiment, the first decimator 114 can adjust the decimation rate while maintaining a continuous output of the $I_1'$ signal 109 and the $Q_1'$ signal 111.

In an embodiment, the channel filter 116 can include multiple filtering components (not shown) to filter a high frequency image that is produced in the $I_1$ signal 105 and the $Q_1$ signal 107 at the first CORDIC mixer 106. The channel filter 116 can also filter a high frequency image that is produced in a first Inphase signal ($I_2$) 117 and a first Quadrature signal ($Q_2$) 119 for the second channel at the second CORDIC mixer 124. The channel filter 116 can also reject out of band noise in the $I_1'$ signal 109 and the $Q_1'$ signal 111 received from the first decimator 114 and in a second Inphase signal ($I_2'$) 121 and a second Quadrature signal ($Q_2'$) 123 for the second channel received from the second decimator 126. In a specific embodiment, the channel filter 116 can include 26-tap finite impulse response (FIR) filters for the first and second channel path.

In a particular embodiment, the pilot filter 128 can include a narrow bandpass filter (BPF) 134 to recover an oversampled pilot signal 129 and to provide the pilot signal 129 to the phase detector 136. The pilot filter can selectively recover the pilot signal 129 from either a third Inphase signal ($I_1''$) 113 and a third Quadrature signal ($Q_1''$) 115 for the first channel, or from the phase output 152 of the CORDIC demodulator 118. In a particular embodiment, the first channel processes frequency modulation (FM) data such as BTSC data, and the pilot filter 128 can receive the phase signal 152 at the BPF 134 to generate the pilot signal 129.

In another particular embodiment, the first channel processes Differential Quadrature Phase-Shift Keying (DQPSK) modulated data, such as NICAM digital data, and the pilot filter 128 can receive the $I_1''$ signal 113 and the $Q_1''$ signal 115 at an absolute value circuit (ABS) 130. The pilot filter 128 can combine the absolute values corresponding to each of the $I_1''$ signal 113 and the $Q_1''$ signal 115 at a summer 132. The BPF 134 can filter an output of the summer 132 to generate the pilot signal 129. The recovered pilot signal 129 can have a pilot signal frequency approximately equal to a NICAM symbol rate of 364 kHz.

In a particular embodiment, the phase detector 136 can receive the pilot signal 129 and provide a control signal 131 to the first decimator 114 to adjust the decimation rate. Generally, the pilot signal can be oversampled at any oversampling rate. In a particular embodiment, the oversampling rate of the pilot signal can be not less than approximately two and not more than approximately sixty-four. In a specific embodiment, the oversampling rate can be approximately four for NICAM data. In another specific embodiment, the oversampling rate can be approximately thirty-two for BTSC data. In a particular embodiment, the phase detector 136 can include sample logic 138 to sample the pilot signal 129 at a rate approximately equal to an integer multiple of a frequency of the pilot signal 129. In a particular embodiment, the integer multiple can be determined by the ASD 148 to have a value of one. In another specific embodiment, the integer multiple can be two, and a sign of every other sample can be inverted. In another specific embodiment, the sample logic 138 can also sample the pilot signal at one or more quarter-wavelengths of the pilot signal to determine a strength of the pilot signal.

In an embodiment, the phase detector 136 can include decimation rate logic 140 to generate the control signal 131 based on the samples of the pilot signal. The control signal 131 can be used to achieve and maintain a phase lock to the pilot signal 129 for processing DQPSK and BTSC data. In some embodiments, the control signal 131 can increase the decimation rate when a sample of the pilot signal 129 is negative and can decrease the decimation rate when a sample of the pilot signal 129 is positive.

In a particular embodiment, the phase detector 136 can be a second-order phase detector. The phase detector 136 can compare samples of the pilot signal 129 to zero. The decimation rate logic 140 can also determine a slope by comparing a sample of the pilot signal 129 to a previous sample of the pilot signal 129. In a specific embodiment, the sample value and the slope value can be independently weighted and used to determine an error value. The error value can be determined using techniques such as a moving average or leaky bucket integration (LBI) of all or some prior weighted sample values and weighted slope values, and the error value can be compared to a predetermined threshold value.

In an particular embodiment, the second CORDIC mixer 124 can generate the first Inphase signal ($I_2$) 117 and the first Quadrature signal ($Q_2$) 119 for the second channel by mixing the signal 103 received from the ADC 102 substantially to baseband using the input frequency 150. The second CORDIC mixer 124 can also include multiple pipelined mixing stages (not shown). In a particular embodiment, the second CORDIC mixer 124 can perform a predetermined number of CORDIC iterations for each received sample of the signal 103. The CORDIC mixer can thus attain a predetermined mixing accuracy without using an oscillator or a multiplication function.

In an illustrative embodiment, the second decimator 126 can perform decimation on each of the $I_2$ signal 117 and $Q_2$ signal 119 at an adjustable decimation rate to produce the second Inphase signal ($I_2'$) 121 and the second Quadrature signal ($Q_2'$) 123 for the second channel. In a particular embodiment, the second decimator 126 can include a first independent decimation circuit (not shown) to decimate the $I_2$ signal 117 and a second independent decimation circuit (not shown) to decimate the $Q_2$ signal 119. In a particular illustrative embodiment, the second decimator 126 can be a variable rate, fractional decimator. In an embodiment, the second channel does not require phase lock to process received data, and therefore the second decimator 126 is not responsive to the control signal 131. However, the second decimator 126 can be responsive to the initial decimation rate corresponding to an audio standard that is determined by the ASD 148.

Broadly, the CORDIC demodulator 118 transforms Inphase and Quadrature data into instantaneous magnitude and instantaneous phase. The instantaneous magnitude can represent amplitude modulation (AM) content. The instantaneous phase, when differentiated, can represent instantaneous frequency of frequency modulation (FM) content. In an embodiment, the CORDIC demodulator 118 can include a single CORDIC core (not shown) that is shared between the first channel, the second channel, and the composite decoder 120. In another embodiment, the CORDIC demodulator 118 can include multiple CORDIC cores (not shown) to avoid or reduce arbitration between the first and second channels and the composite decoder 120.

In a particular embodiment, the CORDIC demodulator 118 can transform the $I_1''$ signal 113 and the $Q_1''$ signal 115 from the first channel into an instantaneous phase value. The CORDIC demodulator can represent a phase differential of samples of the $I_1''$ signal 113 and the $Q_1''$ signal 115 at the phase signal 152. The phase signal 152 can be a first-order approximation to a phase differential that indicates a difference between a current sample of the $I_1''$ signal 113 and the $Q_1''$ signal 115 and the prior sample of the $I_1''$ signal 113 and the $Q_1''$ signal 115.

In a particular embodiment, the CORDIC demodulator 118 can translate the $I_2''$ signal 125 and the $Q_2''$ signal 127 from the second channel into an instantaneous phase value and an instantaneous magnitude value. The CORDIC demodulator 118 can represent a phase differential of samples of the $I_2''$ signal 125 and the $Q_2''$ signal 127 at the phase signal 154. The phase signal 154 can be a first-order approximation to a phase differential that indicates a difference between a current sample of the $I_2''$ signal 125 and the $Q_2''$ signal 127 and the prior sample of the $I_2''$ signal 125 and the $Q_2''$ signal 127. The instantaneous magnitude value can be output to the composite decoder 120 via the signal 156.

In an illustrative embodiment, the CORDIC demodulator 118 can also receive an I signal 160 and a Q signal 162 from the composite decoder 120. The CORDIC demodulator 118 can generate and output a signal 158 that represents a phase differential corresponding to the I signal 160 and the Q signal 162.

In an embodiment, the composite decoder 120 separates different audio channels transmitted across one or more carriers, such as SUM and DIFFERENCE signals of EIAJ, or Second Audio Program (SAP) signals of BTSC. The composite decoder 120 can include multiple filters (not shown) that can be shared between some or all of the audio standards supported by the demodulator system 100. In an embodiment, the composite decoder 120 can perform AM demodulation for double side band transmissions or suppressed carrier transmissions. In an embodiment, the composite decoder 120 can initiate a second round of FM demodulation at the CORDIC demodulator 118 via the I output signal 160 and the Q output signal 162. In another embodiment, the composite encoder 120 can detect the presence of SAP in a BTSC input signal. In another embodiment, the composite encoder 120 can identify a pilot signal in an A2 input signal to determine if the A2 data includes Mono, Stereo, or Dual Channel audio modes.

In an embodiment, the symbol decoder 142 can receive the phase signal 152. The symbol decoder 142 can include symbol recognition logic 144 to adjust a sample of the phase signal 152 by an offset value and to map the adjusted sample to a nearest predetermined phase value of a plurality of phase values. The symbol recognition logic 144 can determine a symbol using a difference between the nearest predetermined phase value and a prior nearest predetermined phase value. The offset value can be computed to at least partially compensate for a phase drift that is introduced to the $I_1$ signal 105 and the $Q_1$ signal 107 by an imperfect frequency match at the first CORDIC mixer 106. In a particular embodiment, a phase accumulator 146 can store the offset value. The phase accumulator 146 can be updated by a detected error of each sample of the phase signal 152.

In a particular embodiment, the symbol decoder 142 can also include logic (not shown) to translate the determined symbol to audio data for input to the composite decoder 120. In a particular illustrative embodiment, the symbol decoder 142 can receive phase data corresponding to a NICAM signal in the phase signal 152. The symbol decoder 142 can determine a NICAM symbol based at least partially on a phase difference between consecutive phase values. The symbol decoder 142 can translate the NICAM symbol to corresponding bit pairs, generate a lock to a NICAM frame sequence in the resulting bit sequence, and provide the NICAM A and B data to the composite decoder 120.

In a particular embodiment, the deemphasis and stereo matrix 122 can receive multiple signals from the composite decoder 120 and apply an appropriate deemphasis to the signal. In an embodiment, the deemphasis and stereo matrix 122 can use unique deemphasis filter coefficients for each supported audio standard to enable a normalized audio output level across different standards with different system gains.

Figure 2:
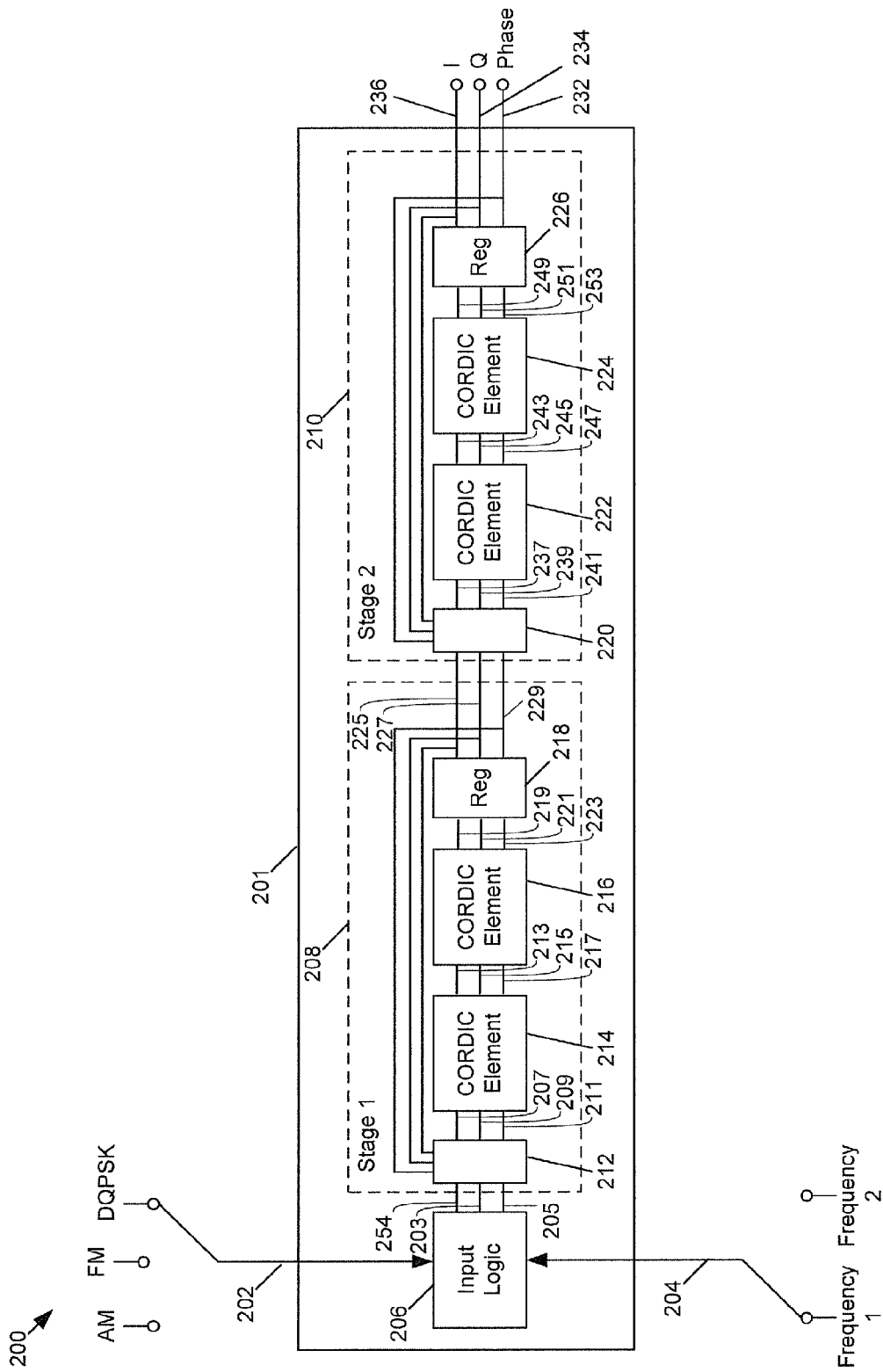
FIG. 2 is a block diagram of a particular illustrative embodiment of a demodulator system.

Referring to FIG. 2, a particular illustrative embodiment of a demodulator system is depicted and generally designated 200. The system 200 includes a CORDIC mixer 201 that receives a modulated signal 202 and an input frequency 204. The CORDIC mixer 201 can use the input frequency 204 to mix the modulated signal 202 substantially to baseband using multiple CORDIC iterations performed by multiple pipelined mixing stages 208 and 210. The CORDIC mixer 201 provides an Inphase (I) signal 236, a Quadrature (Q) signal 234, and a Phase signal 232.

In a particular embodiment, all signals 202 received at the demodulator system 200 may be mixed at the CORDIC mixer 201, independent of the modulation mode of the signal 202. Thus, CORDIC mixer 201 can be configured to receive a first signal having a first modulation mode and a second signal having a second modulation mode. Generally, the first modulation mode and the second modulation mode can be any known modulation mode. In a particular embodiment, the first modulation mode can be a first one of amplitude modulation (AM), frequency modulation (FM), and differential quadrature phase shift key (DQPSK) modulation, and the second modulation mode can be a different one of AM, FM, and DQPSK modulation. In a particular embodiment, a first frequency can be received to mix the first signal substantially to baseband, and a second frequency can be received to mix the second signal substantially to baseband.

In a particular embodiment, the modulated signal 202 can be received from an analog-to-digital converter (ADC), such as the ADC 102 of FIG. 1. The input frequency 204 can be determined by an Audio Standard Detector (ASD), such as the ASD 148 of FIG. 1. The I signal 236 and Q signal 234 can be coupled to a demodulator, such as the CORDIC demodulator 118 of FIG. 1, via a filter path, such as the channel filter 116 of FIG. 1.

In an embodiment, the CORDIC mixer 201 can have input logic 206 to process the modulated signal 202 and the input frequency 204 and to output an initial I signal 254, an initial Q signal 203, and an initial Phase signal 205 to a first mixing stage 208. The first mixing stage 208 can include multiplexer logic 212 coupled to a first CORDIC element 214. The first CORDIC element 214 is configured to perform a CORDIC iteration on input data including an I signal 207, a Q signal 209, and a Phase signal 211. The first mixing stage 208 can also have a second CORDIC element 216 to perform another CORDIC iteration on an I signal 213, a Q signal 215, and a Phase signal 217 output by the first CORDIC element 214. A pipeline register 218 can store values of an I signal 219, a Q signal 221, and a Phase signal 223 output by the second CORDIC element 216. "Pipeline register" as used herein can be a register, one or more flipflops, any other device or component that can store a data value, or any combination thereof.

In an embodiment, the multiplexer logic 212 can selectively provide the I signal 254, the Q signal 203, and the Phase signal 205, or the I signal 225, the Q signal 227, and the Phase signal 229 to the first CORDIC element 214 of the first mixing stage 208. In a particular embodiment, when a new sample of the modulated signal 202 is received, the multiplexer logic 212 can send the I signal 254, the Q signal 203, and the Phase signal 205 from the input logic 206 to the first mixing stage 208. When a new sample of the modulated signal 202 is not received, the multiplexer logic 212 can select the I signal 225, the Q signal 227 and the Phase signal 229 as the input of the first mixing stage 208 for further CORDIC iterations.

In an embodiment, a second mixing stage 210 can have multiplexer logic 220 coupled to a first CORDIC element 222. The first CORDIC element is configured to perform a CORDIC iteration on an I signal 237, a Q signal 239, and a Phase signal 241. The second mixing stage 210 can also have a second CORDIC element 224 to perform another CORDIC iteration on an I signal 243, a Q signal 245, and a Phase signal 247 output by the first CORDIC element 222. A pipeline register 226 can store values of an I signal 249, a Q signal 251, and a Phase signal 253 that are output by the second CORDIC element 224.

In an embodiment, the multiplexer logic 220 can selectively provide the first CORDIC element 222 with either the I signal 225, the Q signal 227, and the Phase signal 229 from the first mixing stage 208, or with the I signal 236, the Q signal 234, and the Phase signal 232 from the pipeline register 226. In a particular embodiment, when a new sample of the modulated signal 202 is received, the multiplexer logic 220 can send the I signal 225, the Q signal 227, and the Phase signal 229 from the first mixing stage 208 to the second mixing stage 210. When a new sample of the modulated signal 202 is not received, the multiplexer logic 220 can select the I signal 236, the Q signal 234, and the Phase signal 232 as the input to the first CORDIC element 222 for further CORDIC iterations.

In a particular embodiment, each CORDIC element 214, 216, 222, and 224 performs a single CORDIC iteration per set of the I, Q, and Phase signals corresponding to a single sample of the modulated signal 202 received at the CORDIC element 214, 216, 222, and 224. In a specific embodiment, a CORDIC iteration can include receiving data corresponding to an I value and a Q value, generating a new I value by shifting the received Q value and adding or subtracting the received I value, and generate a new Q value by shifting the received I value and adding or subtracting the received Q value. The received I value and Q value can be shifted by a number of bits determined by the CORDIC iteration number. In a particular embodiment, the I value and the Q value can be shifted one bit on a first CORDIC iteration for an input signal, and shifted five bits on a fifth CORDIC iteration for the input signal. A phase value can be generated by adding a received phase value to a phase constant that corresponds to the CORDIC iteration number.

In a particular embodiment, each of the first mixing stage 208 and the second mixing stage 210 can perform at least four CORDIC iterations per sample of the modulated signal 202. In a particular embodiment, each of the first mixing stage 208 and the second mixing stage 210 can perform two "processing loops" for each sample of the modulated signal 202. A "processing loop" as used herein is composed of a number of consecutive CORDIC iterations that are serially performed by a mixing stage 208 or 210, where each CORDIC element of the mixing stage performs a single CORDIC iteration per processing loop.

In a particular embodiment, the first mixing stage 208 performs a first processing loop of two CORDIC iterations on the I signal 254, the Q signal 203, and the Phase signal 205 corresponding to a sample of the modulated signal 202. The first processing loop is followed by a second processing loop of two CORDIC iterations using the I signal 225, the Q signal 227, and the Phase signal 229 generated by the previous processing loop. The second mixing stage 210 receives the I signal 225, the Q signal 227, and the Phase signal 229 generated by the second processing loop of the first mixing stage 208 and performs a third processing loop of two CORDIC iterations, followed by a fourth processing loop of two CORDIC iterations on the I signal 236, the Q signal 234, and the Phase signal 232 generated by the third processing loop. Thus, each sample of the modulated signal 202 can be processed by a total of eight CORDIC iterations.

Figure 3:
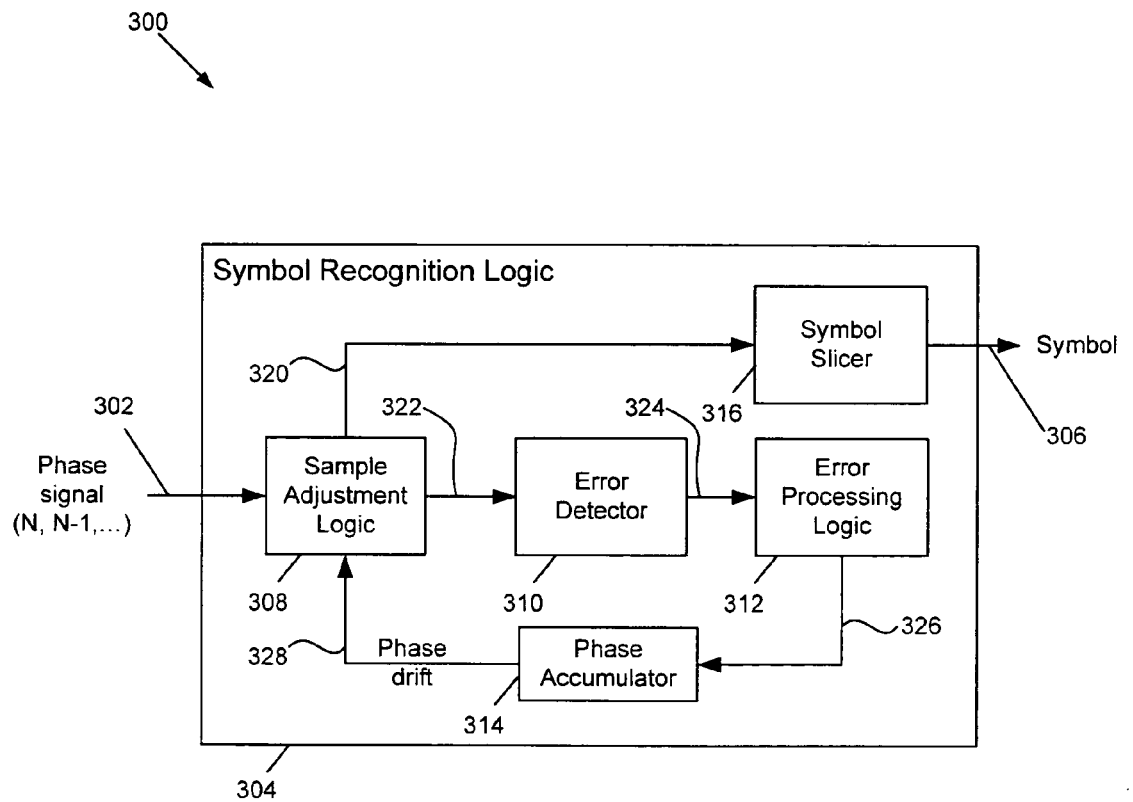
FIG. 3 is a block diagram of a particular illustrative embodiment of a demodulator system.

Referring to FIG. 3, a particular illustrative embodiment of a digital audio processing system is depicted and generally designated 300. The system 300 receives samples of a phase signal input 302. The phase signal 302 is received at symbol recognition logic 304. The symbol recognition logic 304 includes sample adjustment logic 308 to provide an adjusted sample output 322 by adjusting a sample of the phase signal 302 using an offset value 328 representing a phase drift. The adjusted sample 322 is received at an error detector 310. The error detector 310 can map the adjusted sample 322 to a nearest predetermined phase value of a plurality of predetermined phase values. The error detector 310 can output an error value 324 based on a difference between the adjusted sample and the nearest predetermined phase value.

An adjusted sample output 320 of the sample adjustment logic 308 is received at a symbol slicer 316. The symbol slicer 316 determines a symbol using a difference between the nearest predetermined phase value corresponding to one adjusted sample of the sample output 320 and a prior nearest predetermined phase value corresponding to the preceding adjusted sample of the sample output 320. The symbol determined by the symbol slicer 316 is indicated via an output 306.

The error detector 310 can provide an output 324 to error processing logic 312 to update the offset value 328 that is received at the sample adjustment logic 308. The output 324 can be based on a difference between the adjusted sample 322 and the nearest predetermined phase value corresponding to the adjusted sample 322. In a specific embodiment, the error processing logic 312 can filter the output 324 of the error detector 310 using a low-pass filter (LPF), integrate an output of the LPF at an integrator, and output a weighted average of the output of the LPF and the output of the integrator. An output 326 of the error processing logic 312 updates a value stored at a phase accumulator 314. The phase accumulator 314 accumulates output values received from the error processing logic 312, wraps the resulting offset value at 2*PI and provides the offset value 328 to the sample adjustment logic 308.

In a particular embodiment, the input signal 302 to the system 300 can include NICAM phase data. The symbol recognition logic 304 can adjust each sample of the input signal 302 by the offset value 328 received from the phase accumulator 314 that represents a phase drift. In a particular embodiment, the offset value can compensate for a nearly constant phase drift that can be introduced by an imperfect mixing of a received signal to baseband. The symbol slicer 316 can receive a first adjusted sample N−1 and determine a nearest predetermined phase value to the first adjusted sample N−1 from a plurality of predetermined phase values that can include 0 degrees, 90 degrees, 180 degrees, and 270 degrees. The symbol slicer 316 can receive a next adjusted sample N and determine a symbol from a predetermined set of symbols based on a phase difference between the nearest predetermined phase value for N−1 and the adjusted phase value of N. In a particular embodiment, the input signal includes NICAM phase data and the predetermined set of symbols indicates a phase difference of 0 degrees, 90 degrees, 180 degrees, or 270 degrees between the sample N and the prior sample N−1.

In a particular embodiment, the phase signal 302 can be received from a demodulation stage, such as the CORDIC demodulator 118 of FIG. 1, which in turn can receive an input from a CORDIC mixer, such as the CORDIC mixer 106 of FIG. 1, via a decimator, such as the decimator 114 of FIG. 1, and via a filter path such as the channel filter 116 of FIG. 1. The output 306 can provide an indication of the symbol to logic that recovers a data signal and provides the data signal to a composite decoder, such as the composite decoder 120 of FIG. 1.

Figure 4:
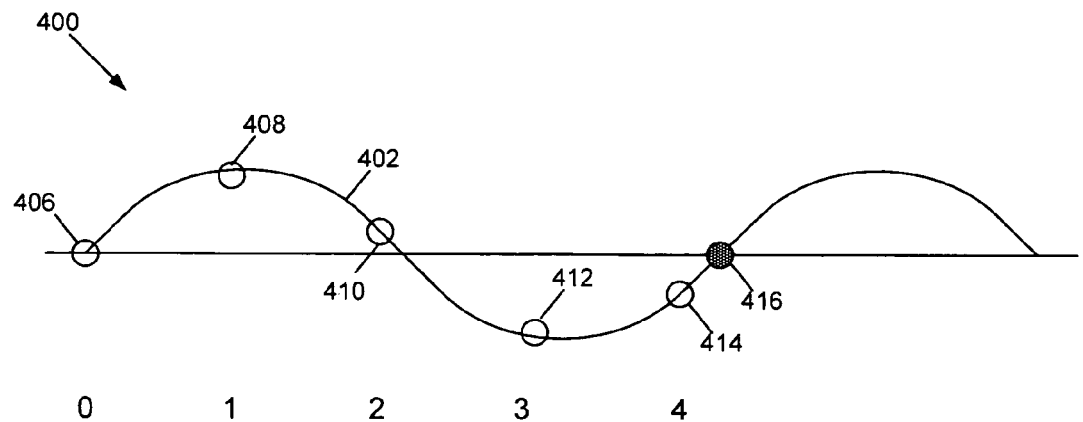
FIG. 4 is a graphical diagram depicting a particular illustrative embodiment of an operation of a demodulator system.

Referring to FIG. 4, a graphical diagram depicting a particular illustrative embodiment of an operation of a digital audio processing system is shown and generally designated 400. An illustrative signal 402 is received and sampled at a substantially predetermined sampling rate. In the particular illustrative embodiment of FIG. 4, the sample rate is approximately four times the frequency of the signal 402. Samples 406, 408, 410, 412 and 414 indicate sample values of the signal 402. The value of the signal 402 at sample 406 is approximately zero, and when phase lock to the signal 402 is acquired the value of the sample 414 will also equal zero, illustrated by phase lock sample 416. However, as depicted in the illustrative embodiment of FIG. 4, sample 414 is less than zero, indicating that the signal 402 is being sampled at too fast of a sample rate. Phase lock will be achieved when the sample rate is reduced so that every fourth sample, such as sample 406 and sample 414, has a zero value.

Figure 5:
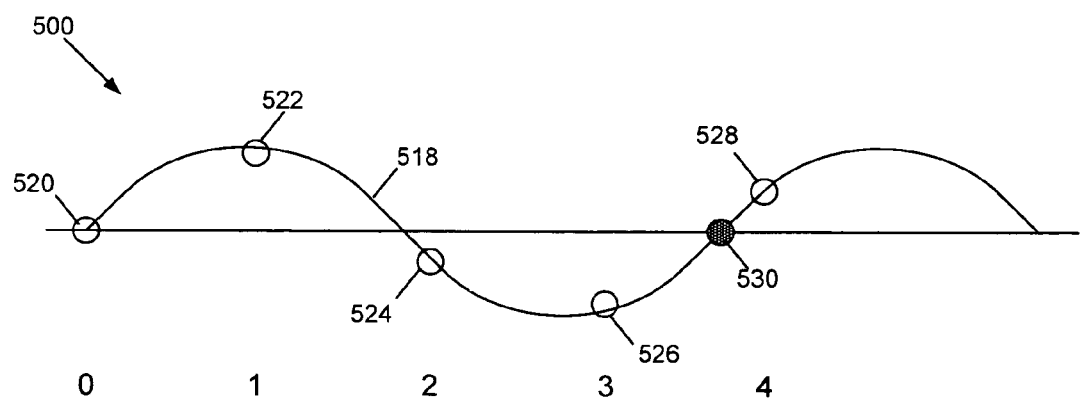
FIG. 5 is a graphical diagram depicting a particular illustrative embodiment of an operation of a demodulator system.

Referring to FIG. 5, a graphical diagram depicting a particular illustrative embodiment of an operation of a digital audio processing system is shown and generally designated 500. Samples 520, 522, 524, 526 and 528 of a signal 518 demonstrate that the signal 518 is sampled at too slow of a sample rate. In particular, sample 520 and sample 528 will both have a zero value when phase lock is acquired and maintained. However, sample 528 is greater than zero, indicating that the sample rate should be increased until sample 528 coincides with the illustrated phase lock sample 530.

Figure 6:
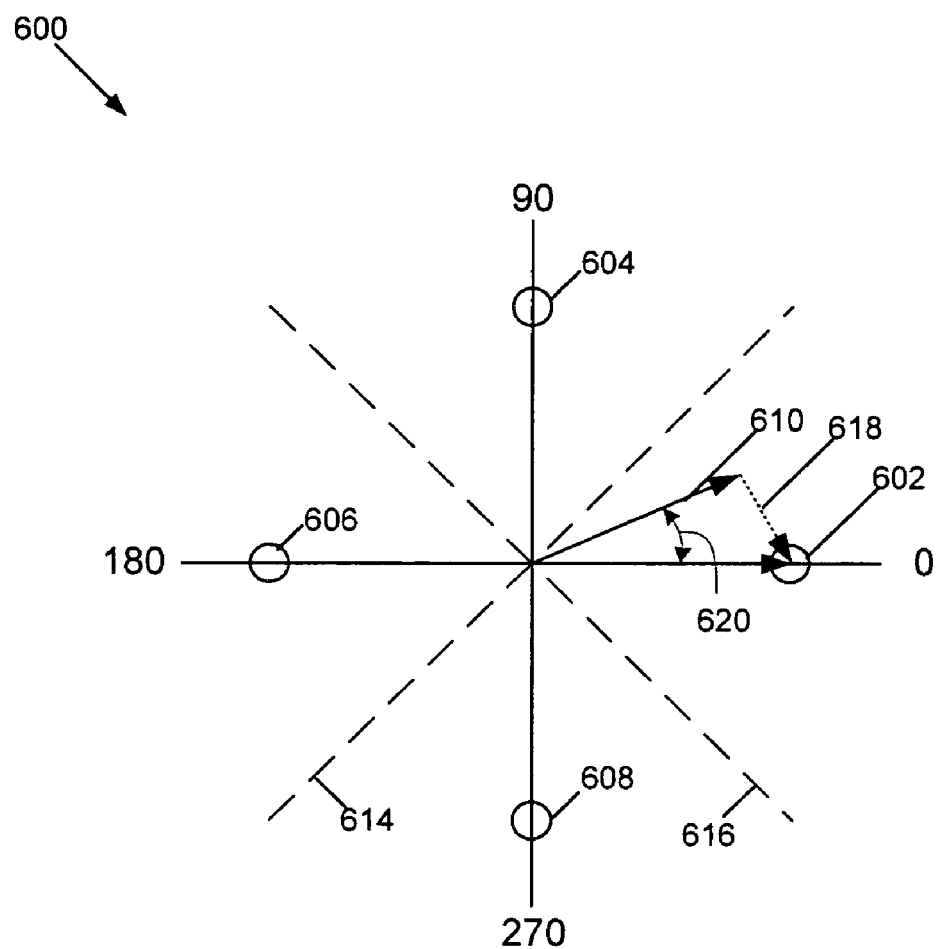
FIG. 6 is a graphical diagram depicting a particular illustrative embodiment of an operation of a demodulator system.

Referring to FIG. 6, a graphical diagram depicting a particular illustrative embodiment of an operation of a digital audio processing system is shown and generally designated 600. A set of predetermined phase values 602, 604, 606 and 608 are indicated at phase values of 0 degrees, 90 degrees, 180 degrees, and 270 degrees, respectively. A first phase boundary 614 and a second phase boundary 616 together bisect each quadrant and graphically indicate which of the predetermined phase values 602, 604, 606 and 608 is nearest to a received phase value. A vector 610 depicts a received phase value having angle 620. Because the endpoint of the phase value vector 610 is less than the phase boundary 614 and greater than the phase boundary 616, the nearest predetermined phase value to vector 610 is the predetermined phase value 602 at 0 degrees. Likewise, a received phase value with an endpoint greater than the first phase boundary 614 and the second phase boundary 616 can be mapped to the predetermined phase value 604 at 90 degrees, a received phase value with an endpoint greater than the first phase boundary 614 and less than the second phase boundary 616 can be mapped to the predetermined phase value 606 at 180 degrees, and a received phase value that is less than the first phase boundary 614 and the second phase boundary 616 can be mapped to the predetermined phase value 608 at 270 degrees. An error vector 618 graphically depicts the error of the vector 610 as an offset from the nearest predetermined phase value 602.

Figure 7:
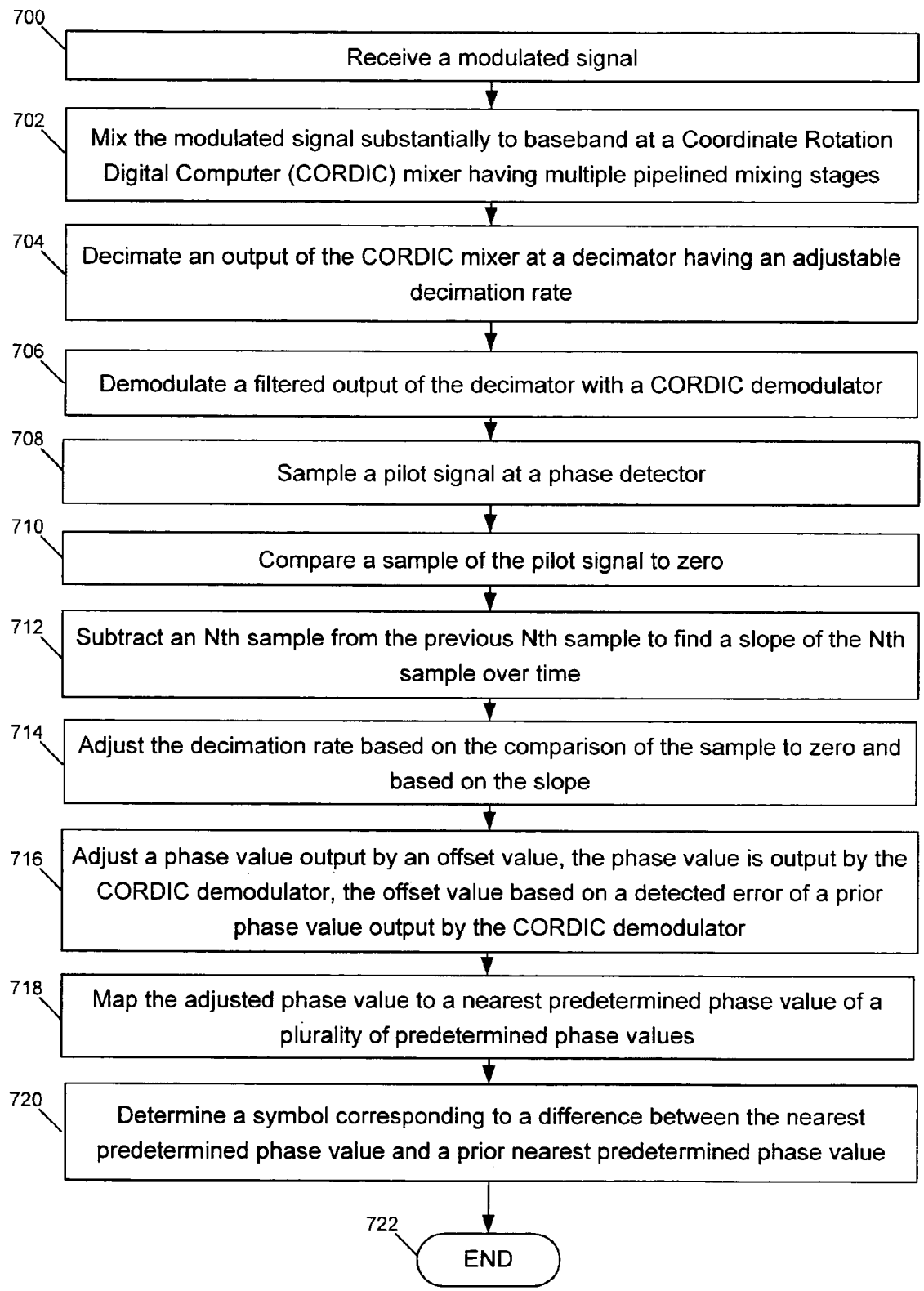
FIG. 7 is a flow chart depicting a particular illustrative embodiment of a demodulator method.

Referring to FIG. 7, a flowchart of a particular illustrative embodiment of a demodulator method is depicted. The method begins with receiving a modulated signal, at 700. The modulated signal is mixed substantially to baseband at a Coordinate Rotation Digital Computer (CORDIC) mixer having multiple pipelined mixing stages, at 702. An output of the CORDIC mixer is decimated at a decimator having an adjustable decimation rate, at 704. In a particular embodiment, a signal output by the decimator has a sampling frequency approximately equal to a pilot frequency multiplied by an oversample factor. The oversample factor can be an integer not less than two and not more than sixty-four. A filtered output of the decimator is demodulated with a CORDIC demodulator, at 706.

In a particular embodiment, a pilot signal is sampled at a phase detector, at 708. In an embodiment, the pilot signal can be oversampled at an oversample factor N that can vary with the modulated signal type. In a specific embodiment, the modulated signal includes a NICAM signal and the pilot frequency is approximately 364 kHz. The NICAM pilot signal can be recovered from the filtered output of the decimator with an oversample factor of four. In another specific embodiment, the modulated signal includes a BTSC signal and the pilot frequency is approximately 15.734 kHz. The BTSC pilot signal can be recovered from an output of the CORDIC demodulator with an oversample factor of thirty-two.

In a particular embodiment, a sample of the pilot signal is compared to zero, at 710. In a particular embodiment, the sample can be compared to zero every N samples of the pilot signal, where N is the oversample factor of the pilot signal. In another particular embodiment, an Nth sample is subtracted from the previous Nth sample to find a slope of the Nth sample over time, at 712.

In a particular embodiment, the decimation rate is adjusted based on the comparison of the sample to zero and based on the slope, at 714. The decimation rate can be decreased based on the sample of the pilot signal having a positive value, a positive slope, or an error value computed from both the value and slope of the sample exceeding a positive threshold. The decimation rate can be increased based on the sample of the pilot signal having a negative value, a negative slope, or an error value computed from both the value and slope of the sample being more negative than a negative threshold. In an illustrative embodiment, the decimation rate can be adjusted based on the samples of the pilot signal to achieve and maintain a phase lock to the pilot signal.

In a particular embodiment, a phase value output is adjusted by an offset value, at 716. The phase value can be output by the CORDIC demodulator, and the offset value can be based on a detected error of a prior phase value output by the CORDIC demodulator. The adjusted phase value is mapped to a nearest predetermined phase value of a plurality of predetermined phase values, at 718. A symbol corresponding to a difference between the nearest predetermined phase value and a prior nearest predetermined phase value is determined, at 720. The method terminates at 722.

While specific systems and components of systems have been shown, it should be understood that many alternatives are available for such systems and components. In a particular illustrative embodiment, for example, a demodulator system may include hardware, software, firmware, or any combination thereof to perform functions and methods of operation as described. It should be understood that particular embodiments may be practiced solely by a processor executing processor instructions and accessing a processor readable memory, or in combination with hardware, firmware, software, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A demodulator system comprising:
   an analog-to-digital converter (ADC) configured to sample a modulated signal and to output a digital signal;
   a Coordinate Rotation Digital Computer (CORDIC) mixer coupled to an output of the ADC, the CORDIC mixer to generate an Inphase (I) signal and a Quadrature (Q) signal based on the digital signal output by the ADC and further based on an input frequency;
   a filter path to process the I signal and the Q signal generated by the CORDIC mixer, wherein the filter path is coupled to at least one decimator;
   a demodulation stage to demodulate an output of the filter path, wherein the demodulation stage includes a CORDIC demodulator; and a symbol decoder to receive a phase signal from the CORDIC demodulator, the symbol decoder including symbol recognition logic to adjust a sample of the phase signal by an offset value, to map the adjusted sample to a nearest predetermined phase value of a plurality of predetermined phase values, and to determine a symbol using a difference between the nearest predetermined phase value and a prior nearest predetermined phase value, wherein the offset value at least partially compensates for a phase drift generated at the CORDIC mixer.

2. The demodulator system of claim 1, wherein the CORDIC mixer includes a plurality of pipelined mixing stages.

3. The demodulator system of claim 2, wherein each mixing stage of the plurality of pipelined mixing stages performs at least four CORDIC iterations per sample of the digital signal received at the CORDIC mixer.

4. The demodulator system of claim 3, wherein the CORDIC mixer is configured to perform eight CORDIC iterations per sample of the digital signal received at the CORDIC mixer.

5. The demodulator system of claim 4, wherein the at least one decimator performs decimation of the I signal and the Q signal at an adjustable decimation rate.

6. A demodulator system comprising:
a Coordinate Rotation Digital Computer (CORDIC) mixer to receive a first input signal modulated using a first modulation mode and to generate a first Inphase (I) signal and a first Quadrature (Q) signal by mixing the first input signal substantially to baseband using a first input frequency, the CORDIC mixer further to receive a second input signal modulated using a second modulation mode and to generate a second I signal and a second Q signal by mixing the second input signal substantially to baseband using a second input frequency;
a filter path to process an output of the CORDIC mixer, wherein the filter path is coupled to at least one decimator;
a demodulation stage to demodulate an output of the filter path, wherein the demodulation stage includes a CORDIC demodulator; and
a symbol decoder to receive a phase signal from the CORDIC demodulator, the symbol decoder including symbol recognition logic to adjust a sample of the phase signal by an offset value, to map the adjusted sample to a nearest predetermined phase value of a plurality of predetermined phase values, and to determine a symbol using a difference between the nearest predetermined phase value and a prior nearest predetermined phase value, wherein the offset value at least partially compensates for a phase drift generated at the CORDIC mixer.

7. The demodulator system of claim 6, wherein the first modulation mode is a first one of amplitude modulation (AM), frequency modulation (FM), and differential quadrature phase shift key (DQPSK) modulation, and wherein the second modulation mode is a different one of AM, FM, and DQPSK modulation.

8. A demodulator system comprising:
a Coordinate Rotation Digital Computer (CORDIC) mixer to generate an Inphase (I) signal and a Quadrature (Q) signal based on a modulated input signal and an input frequency;
a decimator to perform decimation of the I signal and the Q signal at an adjustable decimation rate;
a phase detector to receive a pilot signal and including decimation rate logic to generate a control signal to adjust the decimation rate based on the pilot signal; and
a demodulation stage to demodulate a filtered output of the decimator, wherein the demodulation stage includes a CORDIC demodulator.

9. The demodulator system of claim 8, wherein the phase detector further includes logic to sample the pilot signal at a sample rate approximately equal to an integer multiple of a frequency of the pilot signal, and wherein the integer multiple is one or two.

10. The demodulator system of claim 8, wherein the oversample rate is four or thirty-two.

11. The demodulator system of claim 8, further comprising:
a channel filter path to filter an output of the decimator; and
a pilot filter path to selectively recover the pilot signal from an output of the channel filter path or an output of the demodulator stage, the pilot filter path further to provide the pilot signal to the phase detector.

12. The demodulator system of claim 11, wherein the CORDIC mixer includes multiple pipelined mixing stages.

13. The demodulator system of claim 8, wherein the pilot signal has a pilot signal frequency approximately equaling a Near Instantaneous Companded Audio Multiplex (NICAM) symbol rate.

14. The demodulator system of claim 8, wherein the decimation rate logic includes logic to generate a control signal to increase the decimation rate when a sample of the pilot signal is negative.

15. The demodulator system of claim 8, wherein the decimation rate logic includes logic to generate a control signal to decrease the decimation rate when a sample of the pilot signal is positive.

16. The demodulator system of claim 8, wherein the phase detector is a second-order phase detector.

17. A demodulator system comprising:
a Coordinate Rotation Digital Computer (CORDIC) mixer to generate an Inphase (I) signal and a Quadrature (Q) signal;
a decimator coupled to the CORDIC mixer to adjust a sample rate of at least one of the I signal and the Q signal;
a filter path coupled to the decimator to process an output of the decimator;
a demodulation stage to demodulate an output of the filter path, wherein the demodulation stage includes a CORDIC demodulator, and
a symbol decoder to receive a phase signal from the CORDIC demodulator, the symbol decoder including symbol recognition logic to adjust a sample of the phase signal by an offset value, to map the adjusted sample to a nearest predetermined phase value of a plurality of predetermined phase values, and to determine a symbol using a difference between the nearest predetermined phase value and a prior nearest predetermined phase value, wherein the offset value at least partially compensates for a phase drift generated at the CORDIC mixer.

18. The demodulator system of claim 17, wherein the plurality of predetermined phase values includes 0 degrees, 90 degrees, 180 degrees, and 270 degrees.

19. The demodulator system of claim 17, wherein the symbol is a Near Instantaneous Companded Audio Multiplex (NICAM) symbol.

20. The demodulator system of claim 19, wherein the symbol decoder includes a phase accumulator to provide the offset value.

21. The demodulator system of claim 20, wherein the symbol recognition logic includes logic to modify a value of the phase accumulator based on a difference between an adjusted sample and the nearest predetermined phase value.

22. A demodulation method comprising:
receiving a modulated signal;
mixing an audio signal substantially to baseband with a Coordinate Rotation Digital Computer (CORDIC) mixer having multiple pipelined mixing stages;
decimating an output of the CORDIC mixer with a decimator having an adjustable decimation rate;
demodulating a filtered output of the decimator with a CORDIC demodulator; and
receiving a phase signal from the CORDIC demodulator at a symbol decoder, the symbol decoder including symbol recognition logic to adjust a sample of the phase signal by an offset value, to map the adjusted sample to a nearest predetermined phase value of a plurality of predetermined phase values, and to determine a symbol using a difference between the nearest predetermined phase value and a prior nearest predetermined phase value, wherein the offset value at least partially compensates for a phase drift generated at the CORDIC mixer.

23. The method of claim 22, wherein a signal output by the decimator has a sampling frequency approximately equal to a pilot frequency multiplied by an oversample factor, wherein the oversample factor is an integer not less than two and not more than sixty-four.

24. The method of claim 23, further comprising:
sampling a pilot signal at a phase detector;
comparing a sample of the pilot signal to zero; and
adjusting the decimation rate based on the comparison of the sample to zero.

25. The method of claim 24, wherein the pilot frequency is approximately 364 kHz, and wherein the pilot signal is recovered from the filtered output of the decimator.

26. The method of claim 24, wherein the pilot frequency is approximately 15.734 kHz, and wherein the pilot signal is recovered from an output of the CORDIC demodulator.

27. The method of claim 24, wherein the sample of the pilot signal is compared to zero every N samples of the pilot signal, wherein N is the oversample factor.

28. The method of claim 24, further comprising decreasing the decimation rate based on the sample of the pilot signal having a positive value or having a greater value than a prior sample of the pilot signal.

29. The method of claim 24, further comprising increasing the decimation rate based on the sample of the pilot signal having a negative value or having a lesser value than a prior sample of the pilot signal.

* * * * *